United States Patent [19]

Garrett

[11] Patent Number: 4,867,011
[45] Date of Patent: Sep. 19, 1989

[54] FOUR SPEED PLANETARY GEAR TRANSMISSION HAVING THREE DRIVING MODES

[75] Inventor: Roy J. Garrett, Redford Township, Wayne County, Mich.

[73] Assignee: Ford Motor Company, Dearborn, Mich.

[21] Appl. No.: 217,721

[22] Filed: Jul. 11, 1988

[51] Int. Cl.[4] .......................... F16H 37/06; F16H 37/08
[52] U.S. Cl. ............................................ 74/762; 74/758; 74/766; 74/753; 74/688
[58] Field of Search ................ 74/758, 759, 762, 688, 74/766, 753

[56] References Cited

U.S. PATENT DOCUMENTS

| | | | |
|---|---|---|---|
| 3,314,307 | 4/1967 | Egbert | 74/688 |
| 3,486,398 | 12/1969 | Waclawek | 74/688 |
| 4,347,765 | 9/1982 | Leonard et al. | 74/688 X |
| 4,417,484 | 11/1983 | Gaus et al. | 74/688 |
| 4,454,786 | 6/1984 | Stockton | 74/766 |
| 4,483,212 | 11/1984 | Ohtsuka | 74/758 X |
| 4,509,389 | 4/1985 | Vahratian et al. | 74/759 X |
| 4,602,522 | 7/1986 | Dörpmund | 74/762 X |

FOREIGN PATENT DOCUMENTS 1373970 10/1963 France ............................... 74/688

Primary Examiner—Dwight G. Diehl
Assistant Examiner—William Gehris
Attorney, Agent, or Firm—Donald J. Harrington; Keith L. Zerschling

[57] ABSTRACT

A multiple ratio transmission having planetary gearing with clutches and brakes for establishing selectively each gear ratio, a hydrokinetic torque converter connecting a torque input shaft to a torque input shaft for the gearing and a hydrokinetic torque converter bypass friction clutch for connecting the torque input shaft directly to one of the torque input elements of the planetary gearing whereby the transmission may be conditioned for (i) open converter power drive mode, (ii) a normal drive mode wherein the converter is operated with an open bypass clutch during low speed ratios and wherein a split torque delivery is achieved in a higher speed ratio and wherein the torque converter is bypassed through the clutch during operation in the highest speed ratio, and (iii) an economy light throttle drive mode wherein the transmission is conditioned for open converter operation in the low speed range and for operation with the bypass clutch fully engaged for each of the higher speed ratios.

3 Claims, 3 Drawing Sheets

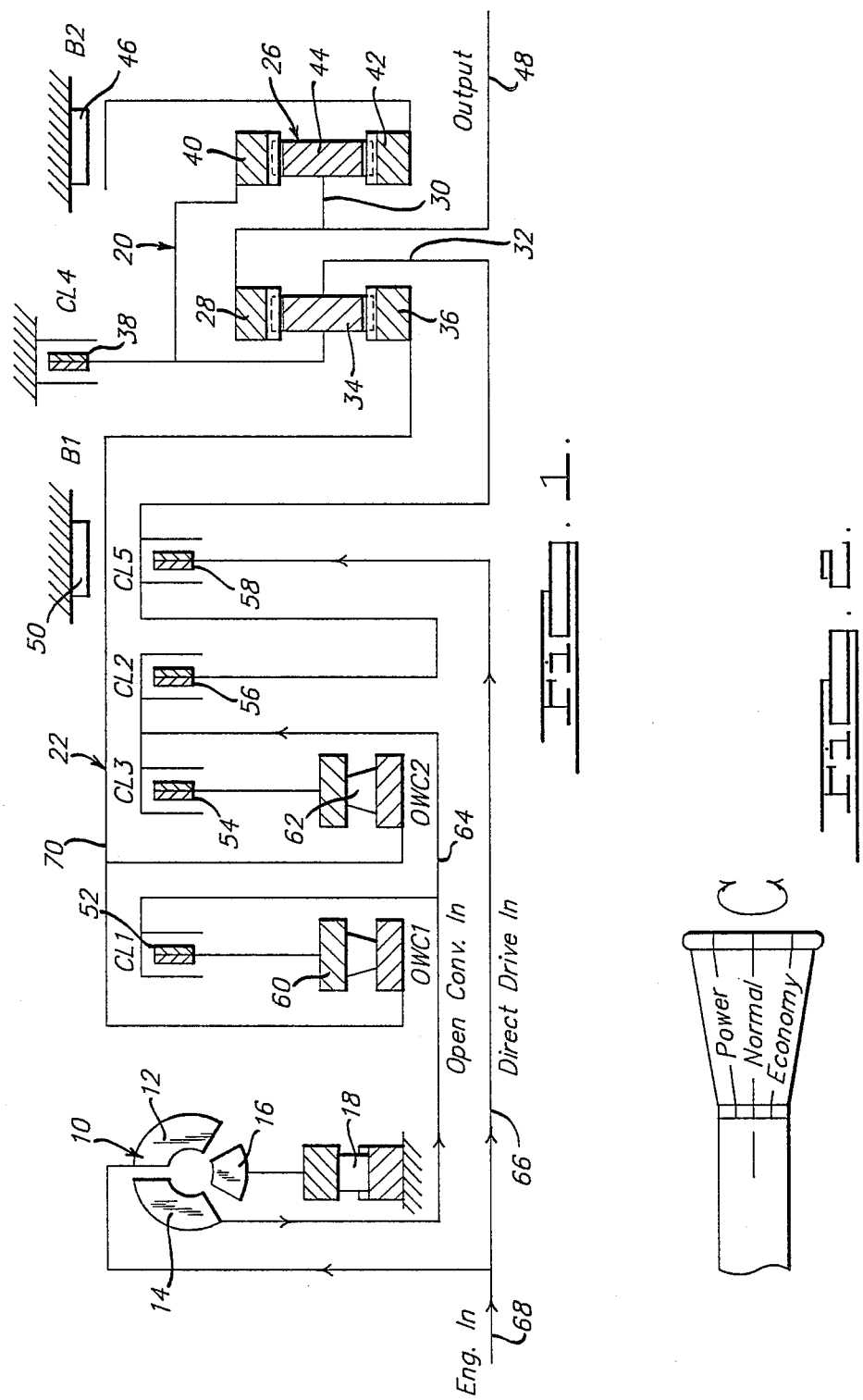

Fig. 3

| Gear | Economy | Normal | Power |
|---|---|---|---|
| 1 | Open Conv. | Open Conv. | Open Conv. |
| 2 | Locked-Up | Open Conv. | Open Conv. |
| 3 | Locked-Up | Partial Lock-Up | Open Conv. |
| 4 | Locked-Up | Locked-Up | Open Conv. |

NORMAL DRIVE MODE

Reverse, 1st, and 2nd — Open Converter Driven
3rd — Partial Lock-Up, 4th — 100% Lock-Up

| Gear | % Lock-Up | AXOD Ratios | CL1 | CL2 | CL3 | CL4 | CL5 | B1 | B2 | Drive OWC1 | Drive OWC2 | Coast OWC1 | Coast OWC2 |
|---|---|---|---|---|---|---|---|---|---|---|---|---|---|
| 1M | Open Conv. | 2.771 | X | | | | | | X | X | | | X |
| 1D | Open Conv. | 2.771 | X | | | | | | X | X | | O/R | |
| 2 | Open Conv. | 1.543 | X | X | | | | | X | O/R | | O/R | |
| 3 | Partial Lock-Up | 1.000 | X | | X | | | | | | | X | |
| 4 | 100% Lock-Up | .694 | | | X | | X | X | | | X | | O/R |
| R | Open Conv. | 2.263 | X | | X | X | X | | | X | | | X |

Fig. 4

POWER DRIVE MODE — All Gears Driven Through Open Conv.

| Gear | % Lock-Up | AXOD Ratios | CL1 | CL2 | CL3 | CL4 | CL5 | B1 | B2 | Drive OWC1 | Drive OWC2 | Coast OWC1 | Coast OWC2 |
|---|---|---|---|---|---|---|---|---|---|---|---|---|---|
| 1M | Open Conv. | 2.771 | X | | | | | | X | X | | | X |
| 1D | Open Conv. | 2.771 | X | | | | | | X | X | | O/R | |
| 2 | Open Conv. | 1.543 | X | X | | | | | X | O/R | | O/R | |
| 3 | Open Conv. | 1.000 | X | X | X | | | | | | X | X | |
| 4 | Open Conv. | .694 | | X | X | | | X | | | O/R | | O/R |
| R | Open Conv. | 2.263 | X | | X | X | | | | X | | | X |

FIG. 3.

ECONOMY — LIGHT — THROTTLE MODE — 2nd, 3rd, and 4th Gears — 100% Locked-Up; 1st and Rev. — Open

| Gear | % Lock-Up | AXOD Ratios | CL1 | CL2 | CL3 | CL4 | CL5 | B1 | B2 | Drive OWC1 | Drive OWC2 | Coast OWC1 | Coast OWC2 |
|---|---|---|---|---|---|---|---|---|---|---|---|---|---|
| 1M | Open Conv. | 2.771 | X | | | | | | X | X | | | X |
| 1D | Open Conv. | 2.771 | X | | | | | | X | X | | O/R | |
| 2 | 100% Lock-Up | 1.543 | X | X | | | X | | X | O/R | | O/R | |
| 3 | 100% Lock-Up | 1.000 | X | X | X | | X | | | | X | X | |
| 4 | 100% Lock-Up | .694 | | | X | | X | X | | | O/R | | O/R |
| R | Open Conv. | 2.263 | X | | X | X | | | | X | | | X |

FIG. 4.

FOUR SPEED PLANETARY GEAR TRANSMISSION HAVING THREE DRIVING MODES

BACKGROUND OF THE INVENTION

My invention comprises improvements in a multiple speed ratio planetary gear transmission such as that shown in U.S. Pat. No. 4,347,765, which is assigned to the assignee of this invention. It is an improvement also in the transmission shown in U.S. Pat. No. 3,486,398. The transmission described in the '765 patent includes a Ravagineaux gear set together with clutches and brakes for establishing each of four forward driving ratios. The highest speed ratio is an overdrive. Overdrive is achieved by anchoring one of the sun gears of the Ravagineaux gear set of larger pitch diameter by means of an overdrive brake band. A direct drive clutch, which connects the torque input shaft or the engine crankshaft to the carrier of the Ravagineaux gear set, is engaged thereby overspeeding the carrier of the gear set. The carrier is connected to the output shaft.

When the direct drive clutch is applied while torque is being distributed to the larger diameter sun gear of the planetary gear set, a split torque delivery is achieved. A portion of the torque is distributed fully mechanically through the direct clutch and the balance being distributed hydrokinetically through the torque converter and through one of the selectively engageable clutches to the larger pitch diameter sun gear. This split torque delivery reduces hydrokinetic losses while retaining a large degree of the cushioning effect of the converter, thus eliminating sharp torque fluctuations in the driveline.

The split torque arrangement, and the open converter option described previously, can be applied to a transmission having the gear characteristics shown in U.S. Pat. No. 4,509,389, which is assigned to the the assignee of this invention. The '389 patent describes a transaxle transmission in which the planetary gearing is located concentrically with respect to the output shaft axis and in spaced parallel disposition with respect to the engine crankshaft axis. The converter of the transaxle of the '389 patent is disposed between the engine and the driving sprocket of a chain transfer drive and is concentrically arranged with respect to the engine crankshaft. The transfer drive distributes torque from the turbine of the converter to the torque input clutches arranged about the axis of the output shaft.

I have made provision in my improved construction for a clutch arrangement for a planetary hydrokinetic torque converter transmission that will provide, at the option of the operator, a fully open converter in each of four forward driving ratios but which will permit the operator to select during operation in the higher speed ratios either a partial hydrokinetic torque delivery or a full mechanical torque delivery to the input elements of the gearing depending upon whether a normal drive mode, an economy mode or light throttle drive mode is desired. The operator has a choice of selecting a normal drive mode, an advanced throttle mode or an economy or light throttle drive mode. The choice of a particular drive mode depends upon the engagement or release of the additional clutch element that is introduced in a strategic fashion in the clutch and brake arrangement.

BRIEF DESCRIPTION OF THE FIGURES OF THE DRAWINGS

FIG. 1 is a schematic representation of the clutch and brake structure as well as the planetary gearing of my improved transmission.

FIG. 2 is a schematic representation of a gear shift selector mechanism in which is embodied a driver controlled selector switch for choosing a power mode, a normal mode or an economy mode.

FIG. 3 is a chart that shows the condition of the hydrokinetic torque converter of the transmission of FIG. 1 in each of the gear ratios and for each of the three drive modes that may be chosen by the operator.

FIG. 4 is a chart showing the clutch and brake engagement and release pattern for establishing the various ratios in the transmission mechanism of FIG. 1 when the driver has chosen a normal drive mode.

FIG. 5 is a chart showing the engagement and release pattern for the clutches and brakes when the operator has chosen a power drive mode.

FIG. 6 is a chart showing the clutch and brake engagement and release pattern for the transmission when the operator has chosen the economy light throttle operating mode.

PARTICULAR DESCRIPTION OF THE INVENTION

In FIG. 1 numeral 10 designates the hydrokinetic torque converter. It has an impeller 12, a turbine 14 and a stator 16 arranged in a toroidal fluid flow path. The stator is anchored against rotation in a direction opposite to the direction of rotation of the impeller by means of an overrunning brake 18.

A planetary gear system is designated by reference numeral 20 and a clutch and brake assembly is designated by means of reference numeral 22.

Planetary gear system 20 comprises two simple planetary gear units 24 and 26. Gear unit 24 comprises a ring gear 28 which is connected directly to the carrier 30 of the companion gear unit 26. The carrier for the gear unit 24 is shown at 32. It has mounted thereon planetary pinions 34 which engage ring gear 28 and the sun gear 36, the latter being connected to a driving sleeve shaft 37. Carrier 32 is connected to driving central shaft 39.

Carrier 32 is adapted to be braked by disc brake 38 (C4).

Gear unit 26 comprises ring gear 40 and sun gear 42. These mesh with planetary pinions 44 journalled on carrier 30. Sun gear 42 is adapted to be braked by friction brake 46 (B2).

Carrier 30 and ring gear 28 are connected directly to power output shaft 48, which is connected in the embodiment shown to the vertical traction wheels through a conventional differential and axle assembly.

Sun gear 36 for the planetary gear unit 24 is braked by brake band 50 during overdrive operation.

The clutch assembly 22 comprises four selectively engageable friction disc clutches 52 (C1), 54 (C3), 56 (C2) and 58 (C5). Overrunning clutches are shown at 60 (OWC1) and 62 (OWC2).

Turbine 14 is connected to turbine sleeve shaft 64, which surrounds a torque input shaft 66 connected directly to the engine crankshaft 68 for the internal combustion engine for the vehicle. The impeller 12 is connected directly to the crankshaft 68.

Turbine shaft 64 is connected to the outer race of the overrunning coupling 60 through friction clutch 52.

The inner race for overrunning coupling 60 is connected to brake drum 70 which is adapted to be braked selectively by the brake 50. Brake drum 70 is connected also to sun gear 36 of the planetary gear unit 24.

Turbine shaft 64 is connected also to the common sides of each of the clutches 54 and 56. Clutch 54 connects turbine shaft 64 to the outer race of overrunning coupling 62 and the inner race of the overrunning coupling 62 is connected directly to the brake drum 70.

Clutch 56 is adapted to connect selectively during intermediate or second speed ratio operation the shaft 64 to the carrier 32. Carrier 32 is connected to one side of the selectively engageable clutch 58 which is applied during operation in the third and the fourth speed ratio when the operator chooses the light throttle economy mode or the normal driving mode. Thus when the operator chooses those two driving modes the engine crankshaft 68 is connected directly to the carrier 32.

As mentioned previously, FIG. 4 shows the clutch and brake engagement and release pattern for the normal drive mode if hill braking is desired. During operation in the low speed ratio, clutches CL1 and CL3 are applied together with the brake B2. Overrunning coupling OWC2 thus can distribute torque from the brake drum 70 to the turbine shaft. The same ratio can be obtained without hill braking by engaging clutch CL1 and brake B2 whereby torque is distributed through overrunning coupling OWC1 to the sun gear 6. With the brake B2 acting as a reaction point for the sun gear 42, a speed ratio reduction of 2.711 is achieved in a working embodiment of my invention.

In operation in each of the low speed ratios described in the preceding paragraphs, the converter is fully open and all of the engine torque is distributed from the engine through the torque converter to the turbine shaft 64.

Third speed ratio opreation is achieved by engaging clutches CL1, CL3 and CL5 simultaneously while the brakes are released. This establishes the 1:1 gear ratio through the gearing 20, but a portion of the driving torque is distributed hydrokinetically since a part of the torque is distributed from the engine crankshaft, through the shaft 66 and through the clutch 58 to the carrier 32 while the balance is distributed through the converter and through the turbine shaft 64 to the clutch C3. All of the torque then is distributed from the engine crankshaft and through the shaft 66 and the engaged clutch 58 to the carrier 32. None of the torque is distributed hydrokinetically.

A fully open converter reverse drive is achieved by engaging clutches CL1, CL3 and CL4. The carrier 32 then acts as a reaction point, and all the torque is distributed to the sun gear 36. This causes the ring gear 28 to rotate the in reverse direction thus driving the output shaft 38 in the reverse direction.

During operation in the power drive mode, the clutches and brakes assume the engagement and release pattern shown in FIG. 5. The first three driving conditions for the power mode are the same as the corresponding driving conditions for the normal mode. Rather than a partial lockup in the third ratio, however, the clutch C5 is not applied as in the case of the normal drive mode. Thus all of the torque is distributed hydrokinetically to the carrier 32. The same is true for operation in the third and fourth ratio. The operation in the reverse drive ratio is the same as in the case of the normal drive mode.

The economy, light throttle operating mode for the second, third and fourth ratios requires the engagement of clutch CL5 as shown in FIG. 6. Under these conditions the torque converter is fully locked as torque is distributed directly from the engine crankshaft and through the shaft 66 to the carrier 32. In the case of the first two driving conditions of FIG. 6, wherein the gearing is conditioned for low speed ratio operation, the clutches and brakes are conditioned in the same manner described previously with reference to the power drive mode.

I contemplate that the transmission system of my invention may be controlled in a manner similar to the electronic powertrain control described in U.S. Pat. No. 4,665,770, which is assigned to the assignee of this invention. That powertrain control includes an electronic module that is adapted to receive engine speed throttle position, engine temperature vehicle speed and other input signals to establish an appropriate output signal that is received by a converter bypass clutch control. That control in turn controls the engagement and release of the bypass clutch. I contemplate also that the control for my present invention will include a driver operated switch for selecting a power mode, a normal drive mode or an economy mode. The output signal for that switch would be one of the inputs for the module that is described with reference to FIG. 3 of U.S. Pat. No. 4,665,770 and would be used in controlling my present transmission mechanism. The switch may be located on the end of a gear shift selector lever, the end of the lever being comprised of a rotary switch nob, as seen in FIG. 2, that can be rotated to any one of three positions to establish any one of three input signals for the powertrain electronic control module.

Having described a preferred embodiment of my invention, what I claim and desire to secure by U.S. Letters Patent is:

1. A multiple ratio power transmission mechanism having planetary gearing and a hydrokinetic torque converter, the latter including a turbine, an impeller and a stator, the impeller being adapted to be connected to a torque input shaft;

a multiple clutch and brake arrangement for controlling the speed ratios of the planetary gearing comprising first clutch means, second clutch means, third clutch means and fourth clutch means located between said converter and said planetary gearing in coaxial disposition with respect to said planetary gearing, said fourth clutch means being in parallel disposition with respect to said third clutch means;

said planetary gearing establishing first, second, third and overdrive ratios and comprising two simple planetary gear units, each gear unit having a sun gear, a ring gear, a carrier, and planet pinions on said carrier engageable with the sun and ring gear, a pair of driving shafts for said planetary gearing, one driving shaft (39) being connected to the carrier of a first planetary gear unit and the other driving shaft (37) being connected to the sun gear of said first gear unit;

an output shaft connected to the carrier of a second planetary gear unit and to the ring gear of said first gear unit, the carrier of said first gear unit being connected to the ring gear of said second gear unit;

first brake means (B1) for anchoring the sun gear of said first gear unit, second brake means (B2) for anchoring the sun gear of said second gear unit, and third brake means (CL4) for anchoring the carrier of said first gear unit;

said first and second clutch means (CL1, CL3) being adapted when applied to connect said turbine to one of said driving shafts, said third clutch means (CL2) being adapted when applied to connect said turbine to the carrier of said first planetary gear unit and said fourth clutch means being adapted to connect said impeller directly to the carrier of said first planetary gear unit during overdrive operation whereby all of the torque of said torque input shaft is transmitted through said fourth clutch means independently of said third clutch means for economy operation in the third ratio, torque transmission being split between said second clutch means and said fourth clutch means during normal drive operation in the third ratio.

2. A multiple ratio power transmission mechanism having planetary gearing and a hydrokinetic torque converter, the latter including a turbine, an impeller and a stator, the impeller being adapted to be connected to a torque input shaft;

a multiple clutch and brake arrangement for controlling the speed ratios of the planetary gearing comprising first clutch means, second clutch means, third clutch means and fourth clutch means located between said converter and said planetary gearing in coaxial disposition with respect to said planetary gearing, said fourth clutch means being in parallel disposition with respect to said third clutch means;

said planetary gearing establishing first, second, third and overdrive ratios and comprising two simple planetary gear units, each gear unit having a sun gear, a ring gear, a carrier, and planet pinions on said carrier engageable with the sun and ring gear, a pair of driving shafts for said planetary gearing, one driving shaft (39) being connected to the carrier of a first planetary gear unit and the other driving shaft (37) being connected to the sun gear of said first gear unit;

an output shaft connected to the carrier of a second planetary gear unit and to the ring gear of said first gear unit, the carrier of said first gear unit being connected to the ring gear of said second gear unit;

first brake means (B1) for anchoring the sun gear of said first gear unit, second brake means (B2) for anchoring the sun gear of said second gear unit, and third brake means (CL4) for anchoring the carrier of said first gear unit;

said first and second clutch means (CL1, CL3) being adapted when applied to connect said turbine to one of said driving shafts, said third clutch means (CL2) being adapted when applied to connect said turbine to the carrier of said first planetary gear unit and said fourth clutch means being adapted to connect said impeller directly to the carrier of said first planetary gear unit during overdrive operation whereby all of the torque of said torque input shaft is transmitted through said fourth clutch means independently of said third clutch means for economy operation in the third ratio, torque transmission being split between said second clutch means and said fourth clutch means during normal drive operation in the third ratio.

said first clutch means including an overrunning coupling and a first friction disc arranged in series disposition, one with respect to the other;

said first friction disc forming a part of a friction clutch mechanism adapted to connect said turbine to one side of said overrunning coupling, the other side of said overrunning coupling being connected to the sun gear of said first planetary gear unit.

3. A multiple ratio power transmission mechanism having planetary gearing and a hydrokinetic torque converter, the latter including a turbine, an impeller and a stator, the impeller being adapted to be connected to a torque input shaft;

a multiple clutch and brake arrangement for controlling the speed ratios of the planetary gearing comprising first clutch means, second clutch means, third clutch means and fourth clutch means located between said converter and said planetary gearing in coaxial disposition with respect to said converter and said planetary gearing, said fourth clutch means being in parallel disposition with respect to said third clutch means;

said planetary gearing establishing first, second, third and overdrive ratios and comprising two simple planetary gear units, each gear unit having a sun gear, a ring gear, a carrier, and planet pinions on said carrier engageable with the sun and ring gear, a pair of driving shafts for said planetary gearing, one driving shaft (39) being connected to the carrier of a first planetary gear unit and the other driving shaft (37) being connected to the sun gear of said first gear unit;

an output shaft connected to the carrier of a second planetary gear unit and to the ring gear of said first gear unit, the carrier of said first gear unit being connected to the ring gear of said second gear unit;

first brake means (B1) for anchoring the sun gear of said first gear unit, second brake means (B2) for anchoring the sun gear of said second gear unit, and third brake means (CL4) for anchoring the carrier of said first gear unit;

said first and second clutch means (CL1, CL3) being adapted when applied to connect said turbine to one of said driving shafts, said third clutch means (CL2) being adapted when applied to connect said turbine to the carrier of said first planetary gear unit and said fourth clutch means being adapted to connect said impeller directly to the carrier of said first planetary gear unit during overdrive operation whereby all of the torque of said torque input shaft is transmitted through said fourth clutch means independently of said third clutch means for economy operation in the third ratio, torque transmission being split between said second clutch means and said fourth clutch means during normal drive operation in the third ratio, said first clutch means including an overrunning coupling and a first friction disc arranged in series disposition, one with respect to the other;

said first friction disc forming a part of a friction clutch mechanism adapted to connect said turbine to one side of said overrunning coupling, the other side of said overrunning coupling being connected to the sun gear of said first planetary gear unit;

said second clutch means including a second friction disc and a second overrunning coupling, the latter having inner and outer races, one race being connected to one side of said second friction disc and the other race being connected to the sun gear of said first planetary gear unit.

* * * * *